United States Patent
Choi et al.

(10) Patent No.: US 7,187,428 B2
(45) Date of Patent: Mar. 6, 2007

(54) METHOD OF FABRICATING FERROELECTRIC LIQUID CRYSTAL DISPLAY

(75) Inventors: Suk Won Choi, Anyang-shi (KR); Su Seok Choi, Hanam-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 119 days.

(21) Appl. No.: 10/924,884

(22) Filed: Aug. 25, 2004

(65) Prior Publication Data

US 2005/0018126 A1    Jan. 27, 2005

Related U.S. Application Data

(62) Division of application No. 10/017,416, filed on Dec. 18, 2001, now Pat. No. 6,798,490.

(30) Foreign Application Priority Data

Dec. 30, 2000   (KR) .......................... 10-2000-86964

(51) Int. Cl.
*G02F 1/1341* (2006.01)
*G02F 1/1339* (2006.01)

(52) U.S. Cl. ...................... 349/189; 349/153; 349/187; 349/190

(58) Field of Classification Search ................ 349/189, 349/153, 190, 154, 187
See application file for complete search history.

(56) References Cited

U.S. PATENT DOCUMENTS

| 5,355,236 A | * | 10/1994 | Mitsui ........................ 349/189 |
| 5,699,138 A | * | 12/1997 | Watanabe et al. ........... 349/189 |
| 5,953,095 A | * | 9/1999 | Ohashi et al. .............. 349/189 |
| 6,271,907 B1 | * | 8/2001 | Masaki et al. .............. 349/189 |

* cited by examiner

*Primary Examiner*—Andrew Schechter
*Assistant Examiner*—Hoan Chau Nguyen
(74) *Attorney, Agent, or Firm*—McKenna Long & Aldridge LLP

(57) ABSTRACT

The present invention is related to a method of fabricating a ferroelectric liquid crystal display which prevents problems of injecting liquid crystal that result from a volume shrinking of the liquid crystal during the injection process. In the method, the pressure in a chamber is changed to above a liquid crystal injection pressure, while cooling a liquid crystal panel after injecting the liquid crystal, and at the same time, the temperature of a liquid crystal tray maintained at a liquid crystal injection temperature, to continue injection of the liquid crystal to an otherwise un-injected portion of the liquid crystal panel, so that an problems related to inadequate injection can be prevented.

25 Claims, 4 Drawing Sheets

METHOD OF FABRICATING FERROELECTRIC LIQUID CRYSTAL DISPLAY

This application is a divisional of Application Ser. No. 10/017,416, now U.S. Pat. No. 6,798,490, which claims the benefit of Korean Patent Application No. 2000-86964, filed on Dec. 30, 2000, which is hereby incorporated by reference as if fully set forth herein.

BACKGROUND OF THE INVENTION

1. Field of the Invention

This invention relates to a method of fabricating a liquid crystal display, and more particularly to a method of fabricating a ferroelectric liquid crystal display that is capable of preventing inadequate injection of a liquid crystal.

2. Description of the Related Art

Generally, a liquid crystal display (LCD) includes a plurality of liquid crystal cells arranged in a matrix. Each liquid crystal cell changes a liquid crystal alignment state in accordance with an applied electric field to control the transmittance of light, thereby providing a gray scale.

A ferroelectric liquid crystal, among other liquid crystals utilized in liquid crystal displays, has the fastest response speed on the order of many microseconds (μs) to a few milliseconds (ms), because ferroelectric liquid crystal material can polarize in the absence of an applied electric field. In addition, ferroelectric liquid crystal material can provide a wide viewing angle, for use in-Plane Switching (IPS), without any special electrode structure or alignment film. Accordingly, the ferroelectric liquid crystal is capable of producing a motion picture display represented in a liquid crystal TV.

Generally, as temperature of the ferroelectric liquid crystal decreases, the liquid crystal exhibits a phase-transition process as follows:

Isotropic Phase→Chiral nematic (N*) phase→Smectic C* (Sm C*) Phase→Crystal.

In such a phase-transition process, a ferroelectric liquid crystal display utilizes the smectic phase, which is a ferroelectric liquid crystal phase that exists at a normal (i.e. room) temperature.

The ferroelectric liquid crystal in the smectic phase is provided by injecting and cooling the liquid crystal, which exhibits the isotropic phase or nematic phase. A problem related to inadequate injection occurs because the volume of the liquid crystal decreases upon its phase-transition to the smectic phase.

FIG. 1 is a figure briefly illustrating a liquid crystal injection device for injecting the liquid crystal into a liquid crystal panel.

The liquid crystal injection device in FIG. 1 includes a chamber 12 and a liquid crystal tray 16 which is located within the chamber and connected with an injection hole 14 of a liquid crystal panel 10. Also, the liquid crystal injection device outside of the chamber 12 further includes a heater (not shown) for heating and controlling the temperature of the liquid crystal panel 10 and the liquid crystal tray 16, and a pressure controller (not shown) controlling the inner pressure of the chamber 12. The transition process of the liquid crystal to the desired ferroelectric liquid crystal phase using the aforementioned liquid crystal injection device is as follows.

Firstly, in an exhaust process using the pressure controller, a vacuum state, that is, a state of an equal pressure, is created inside of the chamber 12 and the liquid crystal panel 10. Afterwards, the injection hole 14 of the liquid crystal panel then contacts the liquid crystal tray 16. At the same time, because the liquid crystal panel 10 and the chamber 12 remain in the vacuum state, the liquid crystal in the liquid crystal tray 16 is not injected into the liquid crystal panel 10. Subsequently, $N_2$ gas is injected into the chamber 12 using the pressure controller to make the inner pressure of the chamber 12 higher than the inner pressure of the liquid crystal panel 10. Due to such an inner pressure difference between the chamber 12 and the liquid crystal panel 10, the liquid crystal in the liquid crystal tray 16 is injected into the liquid crystal panel 10 through the injection hole 14. The difference in inner pressure between the chamber 12 and the liquid crystal panel 10 is increased, thereby easily injecting the liquid crystal into the liquid crystal panel 10. At the same time, the liquid crystal panel 10 and the liquid crystal tray 16 both sustain a high temperature, that is, sustain a liquid crystal injection temperature.

Next, the liquid crystal injected into the liquid crystal panel 10 and the liquid crystal panel 10 are cooled down under a certain pressure to make the liquid crystal undergo a phase transition from the isotropic phase or nematic phase to the smectic phase, which is a ferroelectric liquid crystal phase. Accordingly, the liquid crystal injected into the liquid crystal panel 10 experiences a volume decrease of around 3% upon its phase-transition to the smectic phase. As a result of this volumetric decrease, a problem related to inadequate injection of the liquid crystal occurs and a band configured perpendicular to the direction of the liquid crystal injection is formed where liquid crystal material is not injected.

SUMMARY OF THE INVENTION

Accordingly, the present invention is directed to a method of fabricating ferroelectric liquid crystal display that substantially obviates one or more of the problems due to limitations and disadvantages of the related art.

Accordingly, it is an advantage of the present invention to provide a method of fabricating a ferroelectric liquid crystal display that is capable of avoiding problems related to inadequate injection such as a decrease in volume of a cooled injected liquid crystal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages of the invention, a method of fabricating the ferroelectric liquid crystal display according to one aspect of the present invention, comprises sustaining a pressure in a liquid crystal injected chamber at a first pressure while, at the same time, sustaining the temperature of a liquid crystal panel and a liquid crystal tray contacted to an injection hole thereof at a first temperature to inject the liquid crystal from the liquid crystal tray to the liquid crystal panel; increasing an inner pressure of the chamber to a second pressure higher than the first pressure; and cooling down the liquid crystal panel and the chamber while sustaining the second pressure, and at the same time, maintaining the liquid crystal tray at the first temperature, thereby injecting the liquid crystal into a conventionally and previously un-injected portion of the liquid crystal panel.

The method, according to another aspect of the invention, further comprising the step of, after the step of cooling the liquid crystal panel, decreasing the pressure of the chamber to a third pressure lower than the first pressure, and at the same time, cooling the liquid crystal tray down to a normal temperature.

Here, the first temperature is the temperature where the liquid crystal exhibits one liquid crystal phase comprising one of an isotropic phase and a nematic phase, and the liquid crystal panel is cooled down to the temperature where the injected liquid crystal exhibits the smectic phase.

A method of fabricating a ferroelectric liquid crystal display according to another aspect of the present invention comprises maintaining a pressure in a liquid crystal injected chamber at a first pressure, at the same time, maintaining the temperature of a liquid crystal panel and a liquid crystal tray contacted to an injection hole thereof at a first temperature, to inject the liquid crystal from the liquid crystal tray to the liquid crystal panel; slowly increasing the pressure of the chamber to a second pressure higher than the first pressure while cooling the liquid crystal panel, and at the same time, maintaining the liquid crystal tray at the first temperature to additionally inject the liquid crystal to a previously un-injected portion of the liquid crystal panel.

The method according to another aspect of the invention, further comprising, after cooling the liquid crystal panel, decreasing the pressure of the chamber to a third pressure lower than the first pressure, and at the same time, cooling the liquid crystal tray to a normal temperature.

The pressure in the chamber is increased from the first pressure to the second pressure corresponding to the cooling temperature of the liquid crystal panel or the pressure of the chamber is increased from the first pressure to the second pressure in step type fashion.

Presently, the first temperature is the temperature where the liquid crystal exhibits one liquid crystal phase comprising one of an isotropic phase and a nematic phase, and the liquid crystal panel is cooled to the temperature where the injected liquid crystal exhibits the smectic phase.

A method of fabricating a ferroelectric liquid crystal display according to the other aspect of the present invention comprises maintaining a pressure in a liquid crystal injected chamber at a first pressure, at the same time, maintaining the temperature of a liquid crystal panel and a liquid crystal tray contacted to an injection hole thereof at a first temperature, to inject the liquid crystal from the liquid crystal tray to the liquid crystal panel; cooling the liquid crystal panel, and during its cooling period, repeatedly changing the pressure of the chamber from the first pressure to a second pressure, higher than the first pressure, and at the same time, maintaining the liquid crystal tray at the first temperature to inject the liquid crystal to a previously un-injected portion of the liquid crystal panel.

The method, according to another aspect of the invention, further comprises, after the step of cooling the liquid crystal panel, decreasing the pressure of the chamber decreased to a third pressure lower than the first pressure, and at the same time, cooling the liquid crystal tray to a normal temperature.

The pressure in the chamber is changed to repeat the cycle of rise-hold to the second pressure and drop-hold to the first pressure.

Here, the first temperature is the temperature where the liquid crystal exhibits one liquid crystal phase comprising one of an isotropic phase and a nematic phase, and the liquid crystal panel is cooled to the temperature where the injected liquid crystal exhibits the smectic phase.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
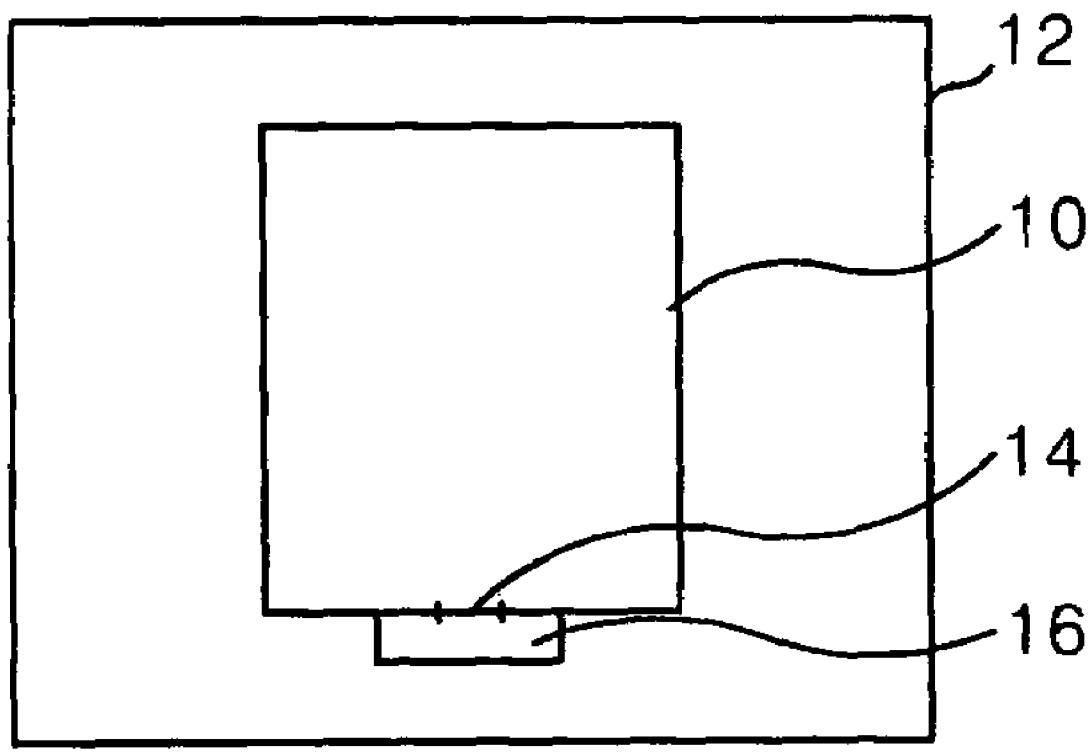
FIG. 1 is a plane figure briefly illustrating a conventional liquid crystal injection device.
Figure 2A:
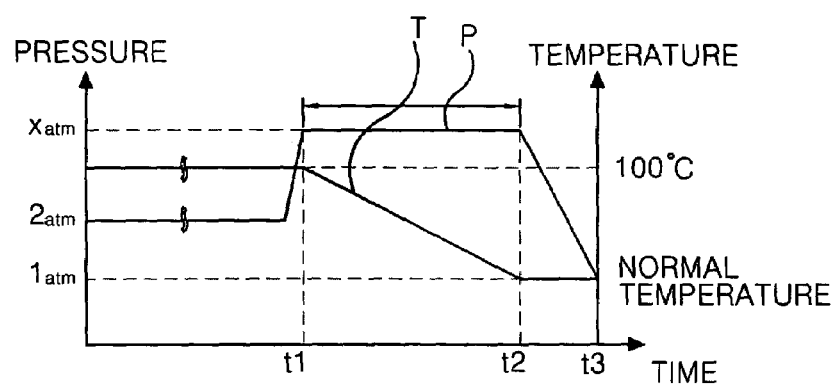
FIG. 2A is a graph illustrating the characteristics of the change of a liquid crystal panel temperature and a chamber pressure in accordance with time for a method of fabricating a ferroelectric liquid crystal display according to a first embodiment of the present invention.
Figure 2B:
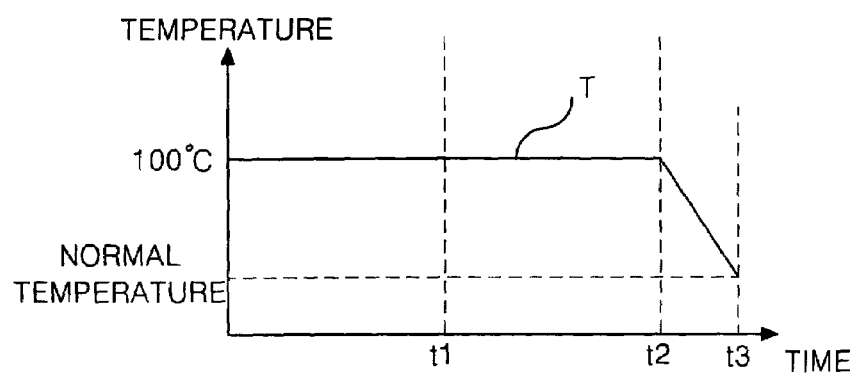
FIG. 2B is a graph illustrating the characteristics of the change of a liquid crystal tray temperature in accordance with time applied for a method of fabricating a ferroelectric liquid crystal display according to the first embodiment of the present invention.

FIGS. 2A and 2B are graphic views illustrating the characteristics of change in the temperature and the pressure in a liquid crystal injection process of a method of fabricating a ferroelectric liquid crystal display according to a first embodiment of the present invention. FIG. 2A is a graph illustrating the characteristics of the changes in the pressure P in a chamber 12 and the temperature T in a liquid crystal panel 10 according to time t in a liquid crystal injection device as shown in FIG. 1. FIG. 2B is a graph illustrating the characteristics of the change in temperature of a liquid crystal in a liquid crystal tray 16.

Firstly, an injection hole 14 of the liquid crystal panel 10 is contacted to the liquid crystal tray 16 in the chamber 12, which is in a vacuum state. Then gas is injected into the chamber 12 to increase and sustain the pressure in the chamber 12 to a first pressure, that is, a liquid crystal injection pressure (e.g., about 2 atmospheres (atm)). At the same time, the liquid crystal panel 10 and the liquid crystal tray 16 are heated to sustain a liquid crystal injection temperature (i.e., 100° C.). Accordingly, a liquid crystal in the isotropic phase or nematic phase with a low viscosity in the liquid crystal tray 16 is injected into the liquid crystal panel 10 through the injection hole 14 because of the inner pressure difference between the chamber 12 and the liquid crystal panel 10.

After the liquid crystal in the isotropic phase or the nematic phase is injected under the sustained liquid injection pressure and temperature, the pressure in the chamber 12 is increased to a second pressure ($X_{atm}$) that is higher than the liquid crystal injection pressure just prior to cooling time (t1) of the liquid crystal panel 10. The increased second pressure ($X_{atm}$) in the chamber 12 is made to remain constant during the period (t2-t1) while the liquid crystal panel 10 is cooled down from the liquid crystal injection temperature to a normal temperature at cooling time (t1). The liquid crystal in the isotropic phase or nematic phase injected to the liquid crystal panel during the period (t2-t1) undergoes a phase-transition process to the smectic phase, which is a ferroelectric liquid crystal phase. As shown in FIG. 2B, as the liquid crystal in the liquid crystal panel is cooled to a normal temperature, the temperature of the liquid crystal tray 16 is maintained at the liquid crystal injection temperature (about 100° C.).

In other words, the chamber 12 sustains the second pressure, which is higher than the liquid crystal injection pressure and the liquid crystal tray 16 sustains the liquid crystal injection temperature during the period (t2-t1), while the liquid crystal panel 10 is cooled. Accordingly, problems related to inadequate injection can be prevented because the liquid crystal is supplied to the previously un-injected portion of the liquid crystal panel 10, which is otherwise formed due to a decrease in the volume of the liquid crystal caused by the cooling of the liquid crystal panel 10.

The pressure in the chamber 12 is decreased to a third pressure (e.g., about $1_{atm}$) that is lower than the liquid crystal injection pressure at the point of time (t3) when these liquid crystal injection process is completed and the temperature of the liquid crystal panel 10 is decreased to the normal temperature. As the pressure in the chamber 12 is decreased, the temperature of the liquid crystal tray 16 is decreased from the liquid crystal injection temperature to the normal temperature.

Figure 3A:
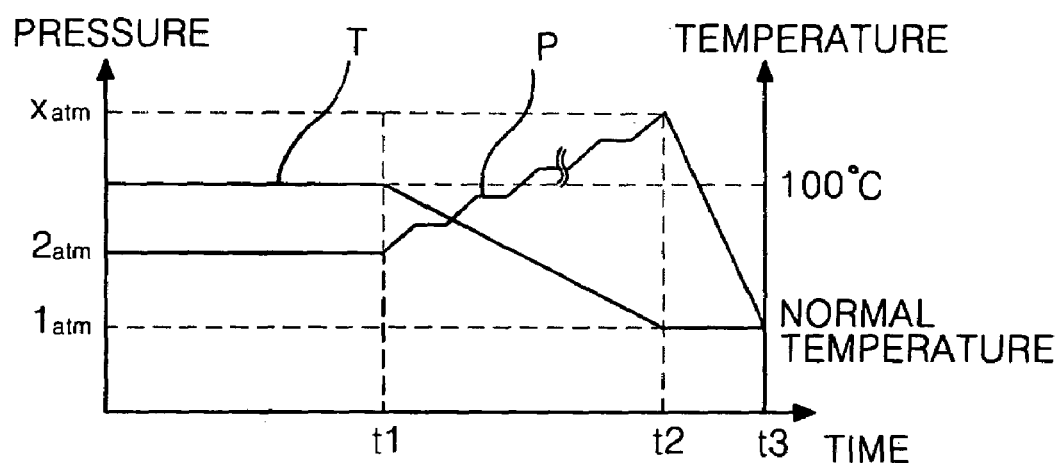
FIG. 3A is a graph illustrating the characteristics of the change of a liquid crystal panel temperature and a chamber pressure in accordance with time for a method of fabricating a ferroelectric liquid crystal display according to a second embodiment of the present invention.
Figure 3B:
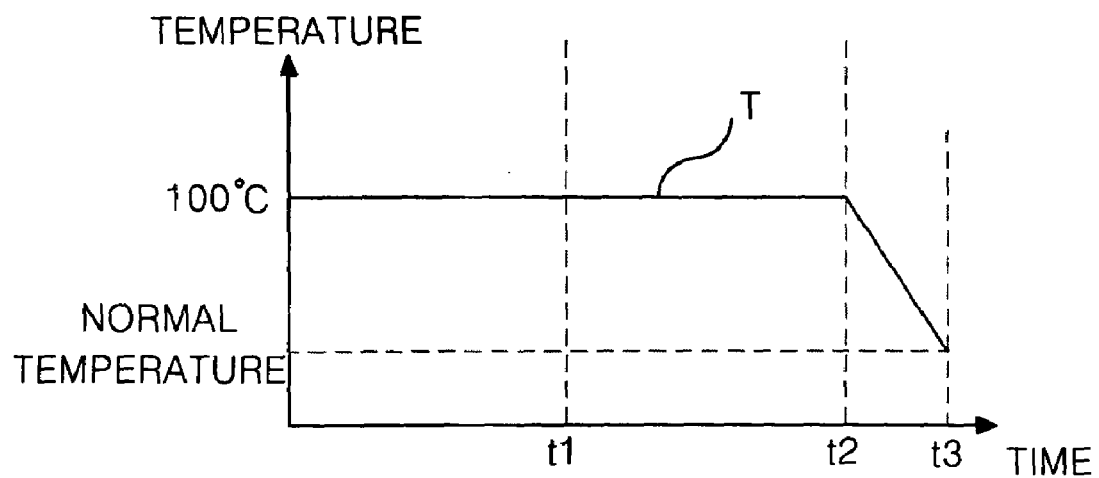
FIG. 3B is a graph illustrating the characteristics of the change of a liquid crystal tray temperature in accordance with the time for a method of fabricating a ferroelectric liquid crystal display according to the second embodiment of the present invention.

FIGS. 3A and 3B are graphic views illustrating the characteristics of change in the temperature and the pressure in a liquid crystal injection process of a method of fabricating a ferroelectric liquid crystal display according to a second embodiment of the present invention. FIG. 3A is a graph illustrating the characteristics of the changes in the pressure P in a chamber 12 and the temperature T in a liquid crystal panel 10 according to time (t) in a liquid crystal injection device as shown in FIG. 1. FIG. 3B is a graph illustrating the characteristics of the change in the temperature of a liquid crystal in a liquid crystal tray 16.

Firstly, an injection hole 14 of the liquid crystal panel 10 is contacted to the liquid crystal tray 16 in the chamber 12, which is in a vacuum state. Then, gas is injected into the chamber 12 to increase and sustain the pressure in the chamber 12 to a first pressure, that is, a liquid crystal injection pressure (e.g., about $2_{atm}$). At the same time, the liquid crystal panel 10 and the liquid crystal tray 16 are heated to sustain a liquid crystal injection temperature (e.g., about 100° C.). Accordingly, a liquid crystal in the isotropic phase or nematic phase with a low viscosity in the liquid crystal tray 16 is injected into the liquid crystal panel 10 through the injection hole 14 because of the inner pressure difference between the chamber 12 and the liquid crystal panel 10.

Thus, after the liquid crystal in the isotropic phase or the nematic phase is injected under the sustained liquid injection pressure and temperature, the pressure in the chamber 12 is made to slowly increase from the liquid crystal injection pressure at the point of the cooling time (t1) of the liquid crystal panel 10. At this time, the pressure in the chamber 12 is made to slowly increase according to the cooling temperature of the liquid crystal panel 10. For example, the pressure in the chamber 12 is increased from the liquid crystal injection pressure in step type fashion. The pressure in the chamber 12 is slowly increased to a second pressure ($X_{atm}$) that is higher than the liquid crystal injection pressure, during the period (t2-t1) while the liquid crystal panel 10 is cooled down from the liquid crystal injection temperature to a normal temperature. The liquid crystal in the isotropic phase or nematic phase injected to the liquid crystal panel during the cooling period (t2-t1) under goes a phase-transition process to the smectic phase. As the liquid crystal in the liquid crystal panel is cooled to a normal temperature, the liquid crystal tray 16 sustains the liquid crystal injection temperature (100° C.).

In other words, the pressure in the chamber 12 slowly increases to the second pressure, which is higher than the liquid crystal injection pressure and the temperature of the liquid crystal tray 16 is sustained at the liquid crystal injection temperature during the period (t2-t1), while the liquid crystal panel 10 is cooled down. Accordingly, problems related to inadequate injection can be prevented because the liquid crystal is supplied to the previously un-injected portion of the liquid crystal panel 10, which is otherwise formed due to a decrease in the volume of the liquid crystal, caused by the cooling of the liquid crystal panel 10.

The pressure in the chamber 12 is decreased to a third pressure (i,e., $1_{atm}$) lower than the liquid crystal injection pressure at the point of time (t3) when these liquid crystal injection process is completed and the temperature of the liquid crystal panel 10 is decreased to the normal temperature. As the pressure in the chamber is decreased, the temperature of the liquid crystal tray 16 is dropped from the liquid crystal injection temperature to the normal temperature.

Figure 4A:
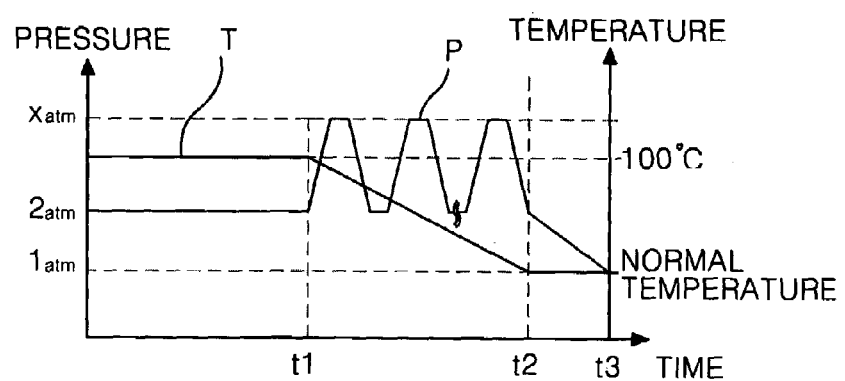
FIG. 4A is a graph illustrating the characteristics of the change of a liquid crystal panel temperature and a chamber pressure in accordance with time for a method of fabricating a ferroelectric liquid crystal display according to a third embodiment of the present invention.
Figure 4B:
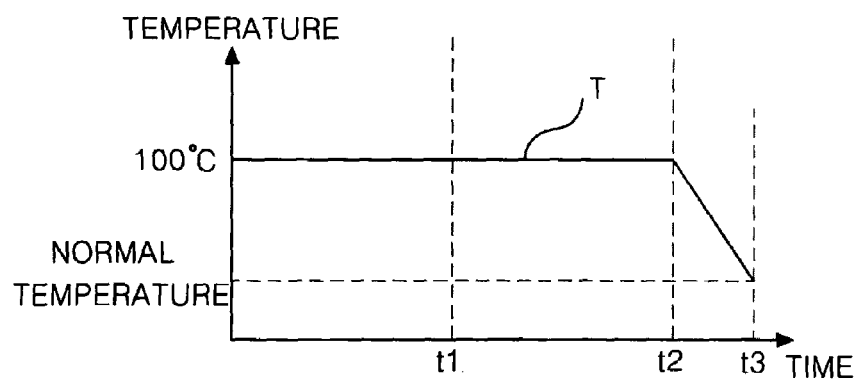
FIG. 4B is a graph illustrating the characteristics of the change of a liquid crystal tray temperature in accordance with time for a method of fabricating a ferroelectric liquid crystal display according to the third embodiment of the present invention.

FIGS. 4A and 4B are graphic views illustrating the characteristics of change in the temperature and the pressure in a liquid crystal injection process of a method of fabricating a ferroelectric liquid crystal display according to a third embodiment of the present invention. FIG. 4A is a graph illustrating the characteristics of the changes in the pressure P in a chamber 12 and the temperature T in a liquid crystal panel 10 according to time (t) in a liquid crystal injection device as shown in FIG. 1. FIG. 4B is a graph illustrating the characteristics of the change in the temperature of a liquid crystal in a liquid crystal tray 16.

Firstly, an injection hole 14 of the liquid crystal panel 10 is contacted to the liquid crystal tray 16 in the chamber 12 which is in a vacuum state. Then, gas is injected into the chamber 12 to increase and sustain the pressure in the chamber 12 to a first pressure, that is, a liquid crystal injection pressure (e.g., about $2_{atm}$). At the same time, the liquid crystal panel 10 and the liquid crystal tray 16 are heated to sustain a liquid crystal injection temperature (e.g., about 100° C.). Accordingly, a liquid crystal in the isotropic phase or nematic phase with a low viscosity in the liquid crystal tray 16 is injected into the liquid crystal panel 10 through the injection hole 14 because of the inner pressure difference between the chamber 12 and the liquid crystal panel 10.

Thus, after the liquid crystal in the isotropic phase or the nematic phase is injected under the sustained liquid injection pressure temperature, the pressure in the chamber 12 is increased to a second pressure higher than the liquid crystal injection pressure at the point of the cooling time (t1) of the liquid crystal panel 10. Subsequently, the pressure in the chamber 12 is repeatedly changed, for example, the pressure in the chamber 12 is increased to a second pressure ($X_{atm}$) for a certain time, then is made to drop to the liquid crystal injection pressure to remain for a certain time, and then is made to increase to the second pressure to remain for a certain time during the cooling period (t2-t1) of the liquid crystal panel 10. The liquid crystal in the isotropic phase or nematic phase under goes a phase-transition process to the smectic phase during the cooling period (t2-t1) of the liquid crystal panel 10. At this moment, the liquid crystal tray 16 sustains the liquid crystal injection temperature (100° C.).

In other words, during the period (t2-t1) while the liquid crystal panel 10 is cooled down, the pressure in the chamber 12 is made to repeat a rise-hold-drop-hold cycle to the pressure above the liquid crystal injection pressure, and the temperature of the liquid crystal tray 10 is sustained at the liquid crystal injection temperature. Accordingly, problems related to inadequate injection can be prevented because the liquid crystal is supplied to the previously un-injected portion of the liquid crystal panel 10 formed due to a decrease in the volume of the liquid crystal, caused by the cooling of the liquid crystal panel 10. Also, because the pressure in the chamber 12 repeats the rise-hold-drop-hold cycle, injection of the liquid crystal into the liquid crystal panel 10 can be made uniformly.

The pressure in the chamber 12 is repeatedly changed and is decreased to a third pressure (e.g., about $1_{atm}$) that is lower than the liquid crystal injection pressure at the point of time (t2) when the liquid crystal injection process is completed and the temperature of the liquid crystal panel 10 is dropped to the normal temperature. At the same time, the temperature of the liquid crystal tray 16 is decreased from the liquid crystal injection temperature to the normal temperature.

As described above, in the method of fabricating the ferroelectric liquid crystal display according to the present invention, the pressure in the chamber is made to be changed during the cooling period after the liquid crystal injection, and in addition, the temperature of the liquid crystal tray is maintained at the liquid crystal injection temperature to supply the liquid crystal to the previously un-injected portion of the liquid crystal panel 10, which is otherwise formed due to the volume shrinking of the liquid crystal, so that problems related to inadequate injection can be prevented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a ferroelectric liquid crystal display, comprising:

maintaining a pressure in a liquid crystal injection chamber at a first pressure, and at the same time, maintaining a liquid crystal tray contacted to a liquid crystal panel and an injection hole thereof, at a first temperature, to inject a liquid crystal from said liquid crystal tray to said liquid crystal panel;

increasing said chamber to a second pressure that is higher than said first pressure, while cooling said liquid crystal panel, and at the same time, maintaining said liquid crystal tray at said first temperature; and decreasing the pressure of said chamber to a third pressure that is lower than said first pressure after cooling said liquid crystal panel, and at the same time, cooling said liquid crystal tray to a normal temperature.

2. The method according to claim 1, wherein the pressure in said chamber slowly increases according to a cooling temperature of said liquid crystal panel when increasing from said first pressure to said second pressure.

3. The method according to claim 1, wherein the pressure in said chamber increases in a step type fashion from said first pressure to said second pressure.

4. The method according to claim 1, wherein said first temperature is the temperature where said liquid crystal exhibits one liquid crystal phase selected from a group comprising an isotropic phase and a chiral nematic phase, and said liquid crystal panel cooled down to the normal temperature to exhibit a smectic phase.

5. The method according to claim 1, wherein said first pressure is about two times atmospheric pressure, and said third pressure is about atmospheric pressure.

6. A method of fabricating a ferroelectric liquid crystal display, comprising:

maintaining a pressure in a liquid crystal injection chamber at a first pressure, and at the same time, maintaining a liquid crystal tray, contacted to a liquid crystal panel and an injection hole thereof, at a first temperature, to inject a liquid crystal from said liquid crystal tray to said liquid crystal panel; and cooling down said liquid crystal panel, during the cooling period thereof, repeatedly changing the pressure of said chamber to a second pressure higher than said first pressure, and at the same time, sustaining the temperature of said liquid crystal tray at said first temperture; and decreasing the pressure in said chamber to a third pressure that is lower than said first pressure, after cooling said liquid crystal panel, and at the same time, cooling said liquid crystal tray to a normal temperature.

7. The method according to claim 6, wherein the pressure in said chamber is changed to repeat the cycle of rise-hold to said second pressure and drop-hold to said first pressure.

8. The method according to claim 6, wherein said first temperature is the temperature where said liquid crystal exhibits one liquid crystal phase selected from the group comprising an isotropic phase and a chiral nematic phase, and said liquid crystal panel is cooled down to the normal temperature to exhibit a smectic phase.

9. The method according to claim 6, wherein said first pressure is about two times atmospheric pressure, and a third pressure is about atmospheric pressure.

10. A method of fabricating a ferroelectric liquid crystal display, comprising:

providing, within a liquid crystal injection chamber, a liquid crystal panel adjacent a liquid crystal tray, said liquid crystal panel and said liquid crystal tray connected by an injection hole;

injecting liquid crystal material from said liquid crystal tray, through said injection hole, into said liquid crystal panel;

cooling said liquid crystal panel from a first temperature to a second temperature while maintaining said liquid crystal tray at said first temperature;

during the cooling, increasing the pressure in said liquid crystal injection chamber from a first pressure to a second pressure; and decreasing the pressure of said liquid crystal injection chamber to a third pressure that is lower than said first pressure when said liquid crystal panel is cooled to said second temperature.

11. The method of fabricating the ferroelectric liquid crystal display according to claim 10, wherein injecting said liquid crystal material further comprises:
providing the liquid crystal injection chamber and the liquid crystal panel in a vacuum state characterized as having equal pressure between the liquid crystal injection chamber and the liquid crystal panel; and
increasing a pressure in said liquid crystal injection chamber from said equal pressure to said first pressure.

12. The method of fabricating the ferroelectric liquid crystal display according to claim 10, further comprising:
decreasing the temperature of the liquid crystal tray from said first temperature to said second temperature when said liquid crystal panel is cooled to said second temperature.

13. The method of fabricating the ferroelectric liquid crystal display according to claim 10, further comprising after said liquid crystal panel is cooled to said second temperature:
decreasing the pressure of said liquid crystal injection chamber from said second pressure to a third pressure that is lower than said first pressure; and
decreasing the temperature of the liquid crystal tray from said first temperature to said second temperature,
wherein the pressure of the liquid crystal injection chamber and the temperature of the liquid crystal tray are decreased during substantially the same period of time.

14. The method of fabricating the ferroelectric liquid crystal display according to claim 10, wherein,
at said first temperature, said liquid crystal material exhibits one of a liquid crystal phase selected from the group comprising an isotropic phase and a chiral nematic phase; and
at said second temperature, said liquid crystal material exhibits a smectic phase.

15. The method of fabricating the ferroelectric liquid crystal display according to claim 10, wherein,
said first pressure is equal to about two times atmospheric pressure; and
said third pressure is equal to about atmospheric pressure.

16. The method of fabricating the ferroelectric liquid crystal display according to claim 10, wherein, the second pressure is maintained during the entire cooling of said liquid crystal panel.

17. The method of fabricating the ferroelectric liquid crystal display according to claim 10, wherein the pressure in the liquid crystal injection chamber is increased gradually to the second pressure during the cooling of said liquid crystal panel.

18. The method of fabricating the ferroelectric liquid crystal display according to claim 10, wherein, the pressure in the liquid crystal injection chamber is increased in a step type fashion to the second pressure during the cooling of said liquid crystal panel.

19. The method of fabricating the ferroelectric liquid crystal display according to claim 10, wherein, the pressure in the liquid crystal injection chamber is increased to the second pressure and decreased to said first pressure repeatedly during the cooling of said liquid crystal panel.

20. The method of fabricating the ferroelectric liquid crystal display according to claim 19, wherein, the pressure in the liquid crystal injection chamber is repeatedly held at said first and second pressures.

21. The method of fabricating the ferroelectric liquid crystal display according to claim 10, wherein decreasing the pressure of said liquid crystal injection chamber to said third pressure includes decreasing the pressure of said liquid crystal injection chamber from said second pressure to said third pressure.

22. A method of fabricating a ferroelectric liquid crystal display, comprising:
providing, within a liquid crystal injection chamber, a liquid crystal panel adjacent a liquid crystal tray, said liquid crystal panel and said liquid crystal tray connected by an injection hole;
injecting liquid crystal material from said liquid crystal tray, through said injection hole, into said liquid crystal panel;
cooling said liquid crystal panel from a first temperature to a second temperature while maintaining said liquid crystal tray at said first temperature;
during the cooling, repeatedly increasing the pressure in said liquid crystal injection chamber from a first pressure to a second pressure and decreasing the pressure in said liquid crystal injection chamber from said second pressure to said first pressure; and
decreasing the pressure of said liquid crystal injection chamber to a third pressure that is lower than said first pressure when said liquid crystal panel is cooled to said second temperature.

23. The method of fabricating the ferroelectric liquid crystal display according to claim 22, wherein the pressure in the liquid crystal injection chamber is repeatedly held at said first and second pressures.

24. The method of fabricating the ferroelectric liquid crystal display according to claim 22, wherein decreasing the pressure of said liquid crystal injection chamber to said third pressure includes decreasing the pressure of said liquid crystal injection chamber from said second pressure to said third pressure.

25. A method of fabricating a ferroelectric liquid crystal display, comprising:
providing, within a liquid crystal injection chamber, a liquid crystal panel adjacent a liquid crystal tray, said liquid crystal panel and said liquid crystal tray connected by an injection hole, wherein the liquid crystal injection chamber and the liquid crystal panel are in a vacuum state characterized as having equal pressure between the liquid crystal injection chamber and the liquid crystal panel;
injecting liquid crystal material from said liquid crystal tray, through said injection hole, into said liquid crystal panel;
cooling said liquid crystal panel from a first temperature to a second temperature while maintaining said liquid crystal tray at said first temperature;
during the cooling, increasing the pressure in said liquid crystal injection chamber from a first pressure to a second pressure; and
decreasing the pressure of said liquid crystal injection chamber to a third pressure that is lower than said first pressure when said liquid crystal panel is cooled to said second temperature.

* * * * *